United States Patent
Mashiki et al.

[11] Patent Number: 5,960,769
[45] Date of Patent: Oct. 5, 1999

[54] AIR INTAKE METHOD AND CONTROLLER FOR ENGINES PERFORMING STRATIFIED CHARGE COMBUSTION

[75] Inventors: Zenichiro Mashiki; Hiroyuki Mizuno, both of Toyota; Shingo Kawasaki, Kariya, all of Japan

[73] Assignee: Toyota Jidosha Kabushiki KAisha, Toyota, Japan

[21] Appl. No.: 08/971,365

[22] Filed: Nov. 17, 1997

[30] Foreign Application Priority Data

Nov. 18, 1996 [JP] Japan .................................. 8-306524
Dec. 18, 1996 [JP] Japan .................................. 8-338322

[51] Int. Cl.$^6$ .................................................. F02B 31/00
[52] U.S. Cl. .......................................... 123/308; 123/295
[58] Field of Search ............................. 123/295, 308, 123/301, 306, 436

[56] References Cited

U.S. PATENT DOCUMENTS

| | | | |
|---|---|---|---|
| 5,765,524 | 6/1998 | Ohsuga et al. | 123/306 |
| 5,819,706 | 10/1998 | Tsuchida et al. | 123/308 |
| 5,887,568 | 3/1999 | Takeyama et al. | 123/306 |

FOREIGN PATENT DOCUMENTS

| | | |
|---|---|---|
| A 5-79337 | 3/1993 | Japan . |
| A 6-93943 | 4/1994 | Japan . |
| A 7-83101 | 3/1995 | Japan . |
| A 8-200116 | 8/1996 | Japan . |

Primary Examiner—Erick R. Solis
Attorney, Agent, or Firm—Oliff & Berridge, PLC

[57] ABSTRACT

An engine having an air intake passage for drawing air into a combustion chamber and an injecting device for injecting fuel into the combustion chamber. A mixture of air and fuel undergoes stratified charge combustion. Sensors detect the operating conditions of the engine, and a swirl control valve opens and closes the air intake passage to swirl the air-fuel mixture. An actuator drives the swirl control valve. A computer computes a target opening angle of the swirl control valve in response to the detected operating conditions. A controller controls the force of the swirl by controlling the actuator in accordance with the computed target opening angle. A detector detects fluctuation of engine rotation. A corrector corrects the target opening angle in response to the detected fluctuation of the engine rotation to improve the performance of the engine.

5 Claims, 13 Drawing Sheets

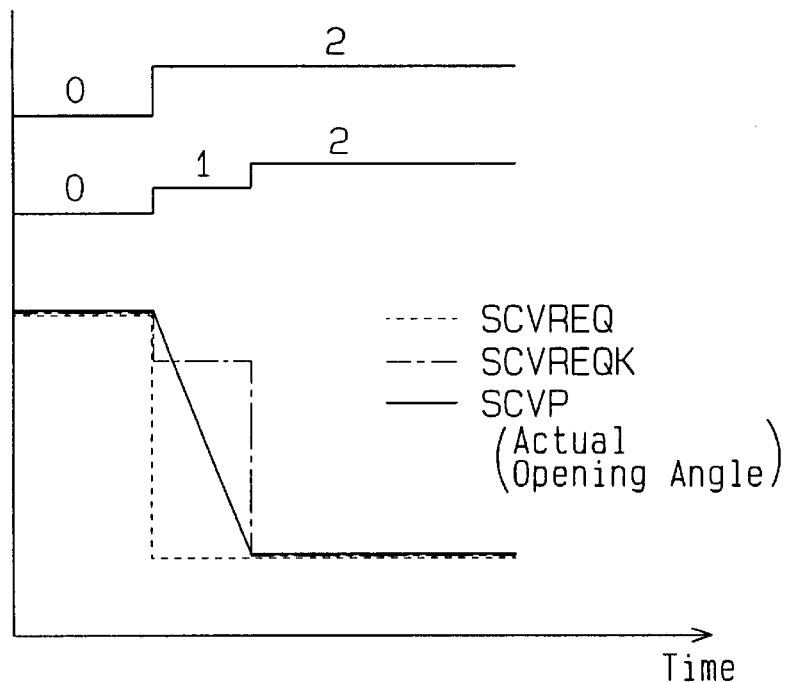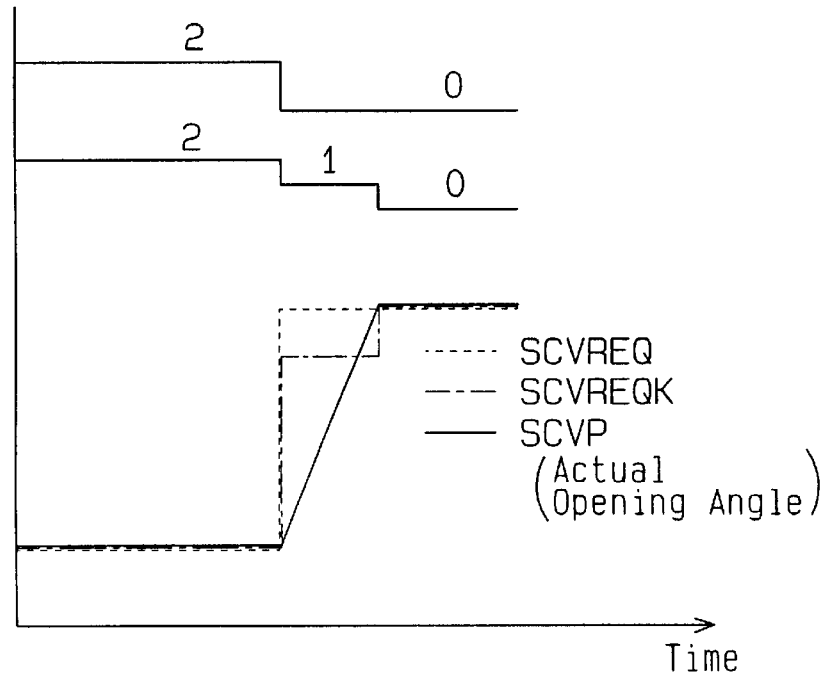

5,960,769

AIR INTAKE METHOD AND CONTROLLER FOR ENGINES PERFORMING STRATIFIED CHARGE COMBUSTION

BACKGROUND OF THE INVENTION

The present invention relates to air intake controllers and control methods for internal combustion engines that perform stratified charge combustion. More particularly, the present invention pertains to air intake controllers and control methods for engines provided with swirl control valves that are opened and closed to produce a swirling flow of air-fuel mixture.

In a typical engine, fuel is injected into an intake port by a fuel injection valve to charge the associated combustion chamber with a homogeneous mixture of fuel and air. In the engine, an air intake passage is opened and closed by a throttle valve, which is operated in cooperation with an acceleration pedal. The opening of the throttle valve adjusts the intake air amount (and ultimately the amount of uniformly mixed air and fuel) that is supplied to the combustion chambers of the engine. This controls engine power.

However, when performing homogeneous charge combustion, the throttling action of the throttle valve drastically decreases the pressure in the intake passage. This increases pumping loss and decreases efficiency. Stratified charge combustion solves such problems. In stratified charge combustion, the throttle valve is opened wide, and fuel is supplied directly into each combustion chamber. This delivers a rich, highly combustible air-fuel mixture to the vicinity of the spark plug and enhances ignitability.

Japanese Unexamined Patent Publication No. 6-93943 describes an engine that produces a swirling flow of air-fuel mixture, which includes the injected fuel, to perform stratified charge combustion. The force of the swirl is controlled by adjusting the opening angle of a swirl control valve (SCV). Furthermore, in this engine, the ignition timing and fuel injection timing with respect to the crank angle is retarded to prevent misfires in the cylinders, especially when the engine is in a cold state.

However, the SCV angle and the swirl force differ between engines. The clearance between the air intake passage and the SCV, the fuel spray, and the required swirl force also differ between engines. When performing stratified charge combustion, during which the interval between fuel injection and ignition is short, it is necessary to produce an appropriate swirl to assist the diffusion and vaporization of the fuel.

These factors are not dealt with appropriately in conventional engines. Thus, fluctuation of the output torque differs between engines. In some cases, this may lead to misfires in the cylinders.

There are engines that perform stratified charge combustion and semi-stratified charge combustion. Stratified charge combustion is performed when the engine load is in a low range, while semi-stratified charge combustion is performed when the engine load is between the low and high load ranges, or in a transient range. During the stratified charge combustion, fuel is injected during the latter half of the compression stroke and is concentrated about the spark plug. In this state, the fuel is ignited. During the semi-stratified charge combustion, fuel is injected during the suction stroke and also during the latter half of the compression stroke. Thus, the concentration of fuel about the spark plug is smaller in comparison to stratified charge combustion. In this state, the fuel is ignited.

Japanese Unexamined Patent Publication No. 7-83101 describes an engine that burns a lean air-fuel mixture to perform lean combustion (or lean burn) by swirling the air-fuel mixture, which includes the injected fuel. In this engine, a swirl control valve (SCV) is provided in the air intake passage. The opening angle of the SCV is adjusted to control the force of the swirl. This burns the air-fuel mixture in a satisfactory state during lean combustion and during stoichiometric combustion (combustion of stoichiometric air-fuel mixture).

A target opening angle of the SCV is computed in accordance with the operating state of the engine (e.g., in accordance with the basic fuel injection amount, which is obtained from the depression degree of the acceleration pedal). The SCV is controlled based on the computed target angle. However, in this prior art engine, a delayed response of the valve may result in a difference between the target angle and the actual angle.

The fuel injection timing is generally determined in accordance with the engine speed or engine load. As a result, if the actual SCV angle differs from the target SCV angle, the swirl may become too strong or too weak. This causes the traveling speed of the injected fuel (air-fuel mixture) to become faster or slower than the required speed. In such cases, the vaporization time of the fuel may be too long or too short. Furthermore, the combustible air-fuel mixture may not be delivered to the vicinity of the spark plug. As a result, combustion becomes unstable. Such state may also lead to misfires in the cylinders.

To deal with the differences between the actual SCV angle and the target SCV angle, the fuel injection timing or the ignition timing may be altered. More specifically, if the swirl is too strong and the fuel travels faster than required, the fuel injection timing may be retarded. On the other hand, if the swirl is too weak and the fuel travels slower than required, the fuel injection timing may be advanced. In this manner, the correction of the fuel injection timing enables the optimal vaporization time to be maintained and guarantees the delivery of combustible air-fuel mixture to the vicinity of the spark plug.

In a system that obtains the basic fuel injection amount based on the depression degree of the acceleration pedal, the value of the basic fuel injection amount changes drastically when the acceleration pedal is depressed in a sudden manner. However, when the depression degree of the acceleration pedal changes suddenly, the amount of air and recirculated exhaust gas drawn into the combustion chamber does not increase in correspondence with the sudden fluctuation of the basic fuel injection amount. Thus, injection of the basic fuel injection amount, which is computed from the depression degree of the acceleration pedal, during rapid acceleration or deceleration of the engine, may cause the air-fuel mixture to become rich or lean.

Therefore, in the prior art, the basic injection fuel amount is graded to vary gradually when the depression degree of the acceleration pedal changes suddenly. That is, a graded fuel injection amount is obtained. An amount of fuel corresponding to the graded fuel injection amount is injected from the fuel injection valve. Therefore, the amount of fuel injected from the fuel injection valve optimally corresponds with the delayed increase in the amount of intake air and recirculated exhaust gas. This enables the air-fuel ratio to be maintained at an optimal value.

However, the target angle of the swirl control valve is computed from the basic fuel injection amount. Therefore, when fuel is injected in correspondence with the graded fuel injection amount during a sudden change in the depression degree of the acceleration pedal, the target SCV angle may be inappropriate with respect to the operating state of the engine. This results in inappropriate fuel injection timing or ignition timing, which are corrected based on the difference between the target SCV angle and the actual SCV angle. Thus, it is difficult to stabilize combustion and prevent misfires during sudden acceleration or deceleration.

SUMMARY OF THE INVENTION

Accordingly, it is an objective of the present invention to provide an air intake controller and method of control for an engine, which performs stratified charge combustion and which includes a swirl control valve, that prevent undesirable torque fluctuation and misfires.

It is a further objective of the present invention to provide an air intake controller and method of control for an engine that stabilize combustion and prevent misfires by optimally correcting either the ignition timing or the fuel injection timing or both when the target opening angle of the swirl control valve differs from the actual opening angle.

In a first aspect of the present invention, an air intake controller for an internal combustion engine is provided. The engine has an air intake passage and an injector for injecting fuel. Stratified charge combustion of mixture of the air and the fuel is executed within a combustion chamber. The controller includes a condition detector for detecting operating conditions of the engine. A swirl control valve selectively opens and closes the air intake passage to swirl the mixture within the combustion chamber when executing the stratified charge combustion. An actuator drives the swirl control valve. A computer computes a target opening angle of the swirl control valve in response to detected operating conditions. A swirl controller controls the force of the swirl by controlling the actuator in response to the computed target opening angle. A fluctuation detector detects fluctuation of the engine rotation. A correcting device corrects the target opening angle in response to the detected fluctuation of the engine rotation. Accordingly, the air-fuel mixture is swirled appropriately even if there are differences in the characteristics of the swirl control valve between engines.

In another aspect of the present invention, a combustion controller of an internal combustion engine is provided. The engine has an air intake passage and an injector for injecting fuel. Lean charge combustion of mixture of the air and the fuel is executed within a combustion chamber. The controller includes an ignitor for igniting the mixture within the combustion chamber. A swirl control valve selectively opens and closes the air intake passage to swirl the mixture within the combustion chamber. An actuator drives the swirl control valve. A condition detector detects operating conditions of the engine. A fluctuation detector detects fluctuation of the engine rotation. An opening detector detects an opening angle of the swirl control valve. An injection controller controls the fuel injection timing of the injector to execute lean charge combustion in accordance with the detected operating conditions. An ignition controller controls the ignition timing of the ignition means in accordance with the detected operating conditions. A first computer computes a load value representing the actual engine load in response to the detected operating conditions. A second computer computes a target opening angle of the swirl control valve in response to the computed actual engine load value. A swirl controller controls the force of the swirl by controlling the opening angle of the swirl control valve through the actuator in response to the computed target opening angle. A correcting device corrects at least one of the ignition timing and the fuel injection timing when the detected opening angle is different from the computed target opening angle and when the fluctuation detecting means detects the fluctuation of the engine rotation.

Accordingly, combustion is stabilized by correcting either the ignition timing or the fuel injection timing even if the actual engine load differs from the theoretical engine load.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 4($b$) is a graph showing the relationship between the SCV opening angle and the number of misfires;

FIG. 4($c$) is a graph showing the relationship between the SCV opening angle and torque;

FIGS. 6–18 relate to a third embodiment;

FIG. 6 is a combustion mode map used to determine the combustion mode;

FIG. 7 is a flowchart illustrating a routine for determining the actual combustion mode;

FIG. 8 is a flowchart also illustrating the routine for determining the actual combustion mode;

FIG. 9 is a flowchart illustrating a routine for computing the graded fuel injection amount;

FIG. 10 is a timing chart illustrating changes of the basic fuel injection amount and the graded fuel injection amount during acceleration;

FIG. 11($a$) is a timing chart illustrating the shifting of the basic combustion mode;

FIG. 11($b$) is a timing chart illustrating the shifting of the actual combustion mode;

FIG. 11($c$) is a timing chart illustrating changes in the actual swirl control valve opening angle and its target opening angle;

FIG. 12($a$) is a timing chart illustrating the shifting of the basic combustion mode;

FIG. 12($b$) is a timing chart illustrating the shifting of the actual combustion mode;

FIG. 12($c$) is a timing chart illustrating changes in the actual swirl control valve opening angle and its target opening angle;

FIG. 13 is a flowchart illustrating a routine for computing the target opening angle and the tentative target opening angle;

FIG. 14 is a map used to obtain the target opening angle of the swirl control valve;

FIG. 15 is a flowchart illustrating routine for driving a swirl control valve;

FIG. 16 is a flowchart showing a routine for computing the ignition timing correction value and the fuel injection timing correction value;

FIG. 18 is a plan diagrammatic view showing the path of fuel as carried by the swirl in relation to the spark plug.

DESCRIPTION OF THE PREFERRED EMBODIMENTS

A first embodiment of an air intake controller apparatus for an engine that performs stratified charge combustion will now be described with reference to the drawings.

Figure 1:
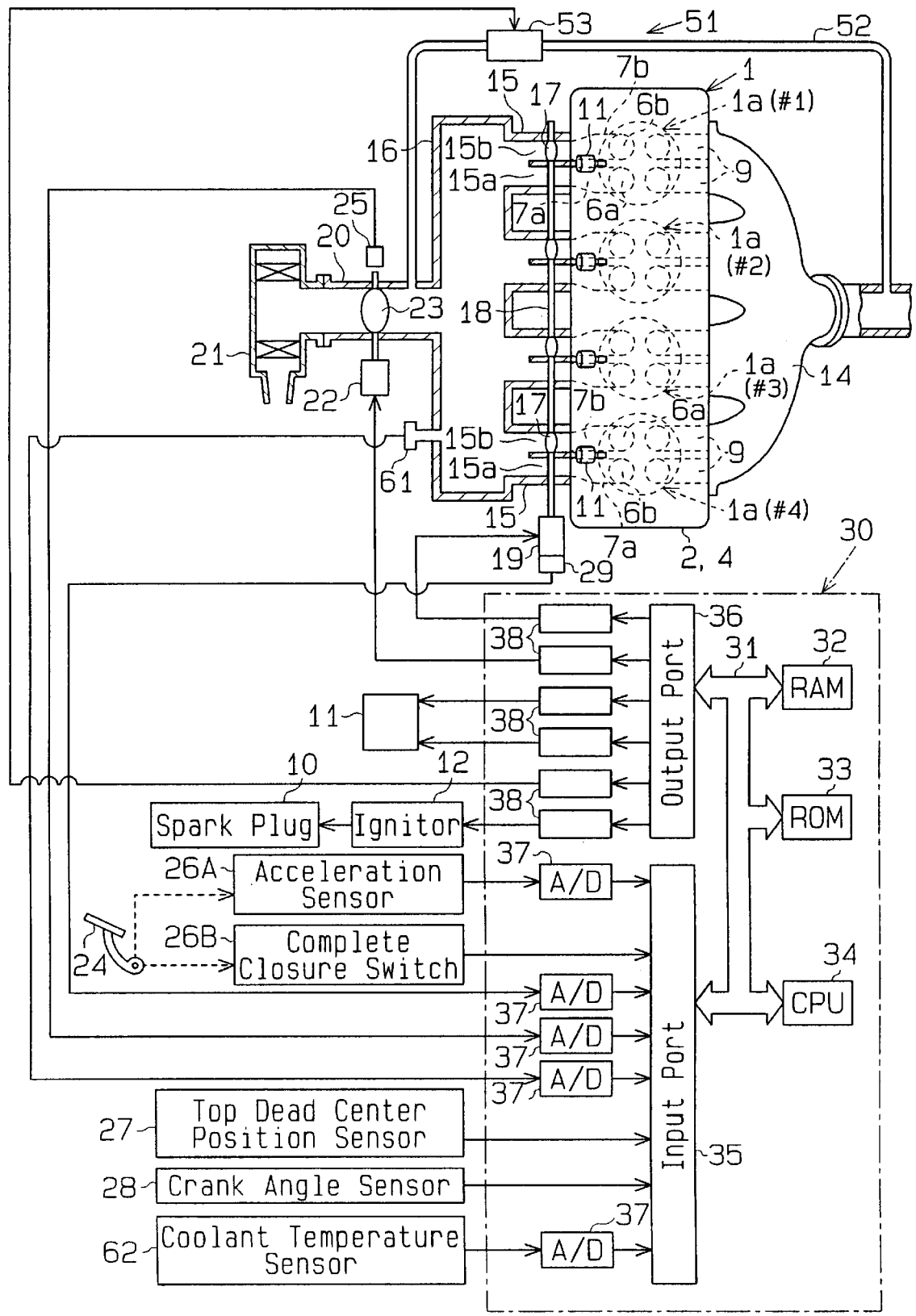
FIG. 1 is a schematic view and block diagram showing a first embodiment of an air intake controller for a stratified charge combustion engine according to the present invention.
Figure 2:
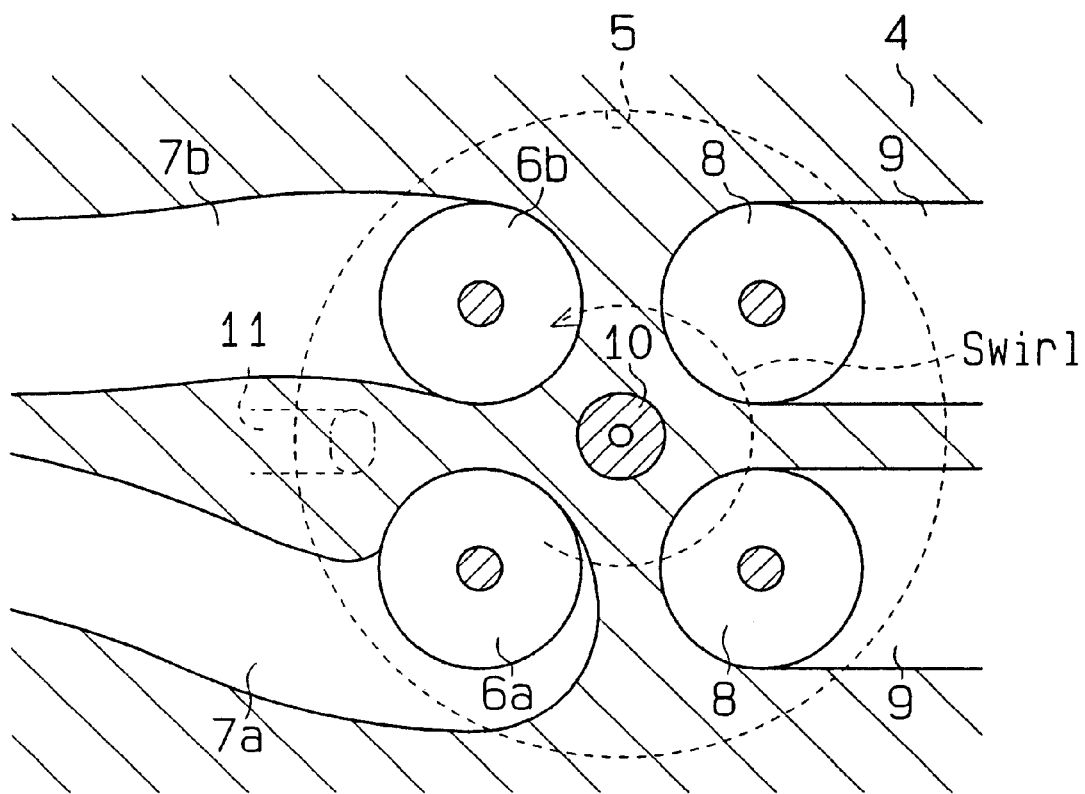
FIG. 2 is an enlarged schematic cross-sectional view showing a cylinder of the engine of FIG. 1.

FIG. 1 is a schematic view showing an air intake controller of an automobile engine that injects fuel directly into its cylinders. An engine 1 is provided with, for example, four cylinders 1a (#1, #2, #3, #4). The structure of the combustion chamber of each cylinder 1a is shown in FIG. 2. As shown in these drawings, the engine 1 has a cylinder block 2 that accommodates pistons. The pistons are reciprocated in the cylinder block 2. A cylinder head 4 is arranged on top of the cylinder block 2. A combustion chamber 5 is defined between each piston and the cylinder head 4. As shown in FIG. 2, four valves (first intake valve 6a, second intake valve 6b, and two exhaust valves 8) are provided for each cylinder 1a. The first intake valve 6a is provided with a first intake port 7a while the second intake valve 6b is provided with a second intake port 7b. Each exhaust valve 8 is provided with an exhaust port 9.

As shown in FIG. 2, the first intake port 7a is a helical port that extends in a helical manner. The second port 7b extends in a generally straight manner. Spark plugs 10 are arranged at the middle of the cylinder head 4. High voltage is applied to each spark plug 10 by an ignitor 12 through a distributor (not shown). The ignition timing of the spark plugs 10 is determined by the output timing of the high voltage sent from the ignitor 12. A fuel injection valve 11 is arranged near the inner wall of the cylinder head at the vicinity of each set of first and second intake valves 6a, 6b. The fuel injection valve 11 is used to inject fuel directly into the associated cylinder 1a.

As shown in FIG. 1, the first and second intake ports 7a, 7b of each cylinder 1a are connected to a surge tank 16 by a first intake passage 15a and a second intake passage 15b, which are defined in an intake manifold 15. A swirl control valve 17 is arranged in each second intake passage 15b. The swirl control valves 17 are connected to, for example, a step motor 19 by a common shaft 18. The step motor 19 is controlled by signals sent from an electronic control unit (ECU) 30.

The surge tank 16 is connected to an air cleaner 21 through an intake duct 20. An electrically controlled throttle valve 23, which is opened and closed by a step motor 22, is arranged in the intake duct 20. The ECU 30 sends signals to drive the step motor 22 and open and close the throttle valve 23. The throttle valve 23 adjusts the amount of intake air that passes through the intake duct 20 and enters the combustion chambers 5. In this embodiment, the intake duct 20, the surge tank 16, the first intake passages 15a, and the second intake passages 15b constitute an air intake passage. A throttle sensor 25 is arranged in the vicinity of the throttle valve 23 to detect the opening angle (throttle angle TA) of the valve 23. The exhaust ports 9 of each cylinder 1a are connected to an exhaust manifold 14. After combustion, the exhaust gas is sent to an exhaust pipe (not shown) through the exhaust manifold 14.

A conventional exhaust gas recirculation (EGR) mechanism 51 recirculates some of the exhaust gas through an EGR passage 52. An EGR valve 53 is arranged in the EGR passage 52. The EGR passage 52 connects the downstream side of the throttle valve 23 in the intake duct 20 to an exhaust duct. The EGR valve 53 includes a valve seat, a valve body, and a step motor (none of which is shown). The EGR mechanism 51, the EGR passage 52, the EGR valve 53, the valve seal, the valve body, and the step motor constitute an exhaust gas recirculation system. The opening area of the EGR valve 53 is altered by causing the step motor to intermittently displace the valve body with respect to the valve seat. When the EGR valve 53 opens, some of the exhaust gas sent into the exhaust duct enters the EGR passage 52. The gas is then drawn into the intake duct 20 through the EGR valve 53. In other words, some of the exhaust gas is recirculated by the EGR mechanism 51 and returned to the air-fuel mixture. The recirculation amount of the exhaust gas is adjusted by the opening amount of the EGR valve 53.

The ECU 30 is a digital computer provided with a random access memory (RAM) 32, a read only memory (ROM) 33, a central processing unit (CPU) 34, which is a microprocessor, an input port 35, and an output port 36 that are connected to one another by a bidirectional bus 31. The ECU 30 constitutes an apparatus for computing the target opening angle of the swirl control valves 17, an apparatus for controlling the swirl, and an apparatus for correcting the opening angle.

An acceleration pedal 24 is connected to an acceleration sensor 26A. The acceleration sensor 26A generates voltage proportional to the degree of depression of the acceleration pedal 24. This enables the acceleration pedal depression degree ACCP to be detected. The voltage output by the acceleration sensor 26A is input into the input port 35 by way of an analog to digital (A/D) converter 37. The acceleration pedal 24 is also provided with a complete closure switch 26B to detect when the pedal 24 is not pressed at all. The closure switch 26B outputs a complete closure signal of one when the acceleration pedal 24 is not pressed at all and outputs a complete closure signal of zero when the acceleration pedal 24 is pressed. The output voltage of the closure switch 26B is also input to the input port 35.

A top dead center position sensor 27 generates an output pulse when, for example, the piston in the first cylinder 1a (#1) reaches the top dead center position during the suction stroke. The output pulse is input to the input port 35. A crank angle sensor 28 generates an output pulse each time a crankshaft of the engine 1 is rotated by a crank angle CA of 30 degrees. The CPU 34 reads the output pulses of the top dead center position sensor 27 and the crank angle sensor 28 to compute the engine speed NE.

The rotational angle of the shaft 18 is detected by a swirl control valve sensor 29 to measure the opening angle, or the actual angle SCV, of the swirl control valves 17. The signal output of the swirl control valve sensor 29 is input to the input port 35 by way of an A/D converter 37.

The throttle sensor 25 detects the throttle angle TA. The signal output of the throttle sensor 25 is input to the input port 35 by way of an A/D converter 37.

An intake pressure sensor 61 is provided to detect the pressure in the surge tank 16 (intake pressure PIM). A coolant temperature sensor 62 is provided to detect the temperature of the engine coolant (coolant temperature THW). The signal outputs of the sensors 61, 62 are input to the input port 35 by way of A/D converters 37.

The throttle sensor 25, the acceleration sensor 26A, the complete closure switch 26B, the top dead center position sensor 27, the crank angle sensor 28, the swirl control valve sensor 29, the intake pressure sensor 61, and the coolant temperature sensor 62 constitute an apparatus for detecting the operating conditions of the engine 1. The crank angle sensor 28 and the ECU 30 constitute an apparatus for detecting the output fluctuation of the engine 1.

The output port 36 is connected to the fuel injection valves 11, the step motors 19, 22, the ignitor 12, and the EGR valve 53 (step motor) by way of drive circuits 38. The ECU 30 optimally controls the fuel injection valves 11, the step motors 19, 22, the ignitor 12, and the EGR valve 53 with control programs stored in the ROM 33 based on signals sent from the sensors 25–29 and 61–64.

Figure 3:
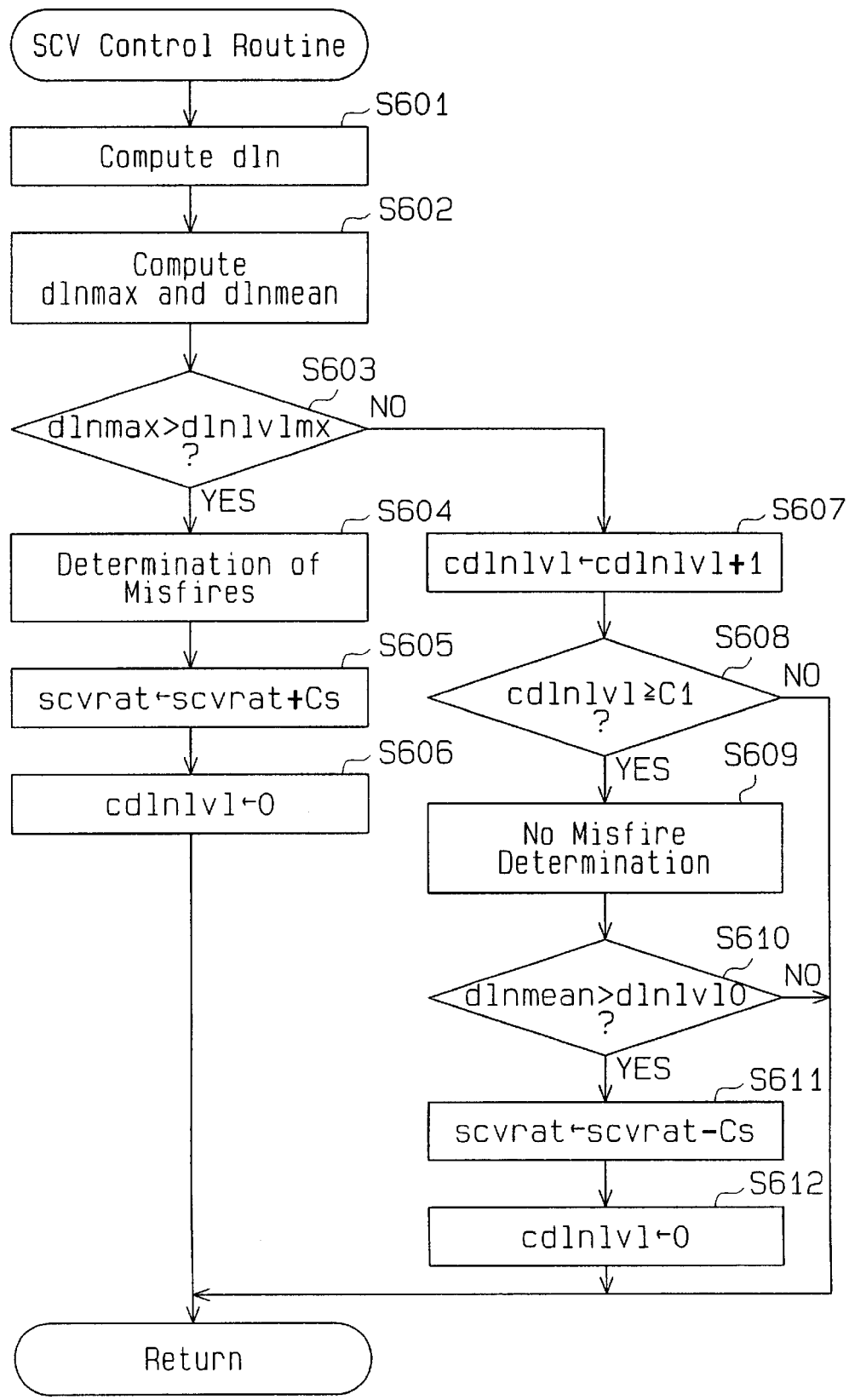
FIG. 3 is a flowchart illustrating a swirl control valve (SCV) control routine executed by the electronic control unit (ECU)

The control programs of the above engine air intake controller will now be described with reference to the flowcharts. FIG. 3 is a flowchart illustrating the air intake control, that is, the SCV control routine executed during stratified charge combustion to control each swirl control valve (SCV) 17. The SCV control routine is executed once for every predetermined crank angle (e.g., 720 degrees CA).

When entering the SCV control routine, the ECU 30 first carries out step S601 and computes the torque decrease dln. The torque decrease dln is obtained by computing the difference between the engine speed detected when the crank angle corresponds to 720 degrees and the engine speed detected when the crankshaft is rotated by a predetermined angle (e.g., 90 degrees CA) from the crank angle of 720 degrees. More specifically, first, the angular velocity of the crankshaft at 720 degrees CA (immediately after ignition of the corresponding cylinder) is determined. Then, the angular velocity of the crankshaft after the crankshaft rotates 90 degrees CA therefrom is determined. The torque decrease dln is computed by subtracting the second angular velocity raised to the second power from the first (720 degrees CA) angular velocity raised to the second power. A misfire in the cylinders causes a decrease in the output torque of the crankshaft.

At step S602, the ECU 30 refers to the value of the torque decrease dln in the previous cycle of this routine and the torque decrease dln obtained in the prior step (step S601) of the current cycle to select the maximum torque decrease dlnmax and to compute the average torque decrease dlnmean of a predetermined number of crankshaft rotations (at least four crankshaft rotations).

At step S603, the ECU 30 determines whether or not the present maximum torque decrease dlnmax is greater than a predetermined misfire judgement value dlnlvlmx. If the maximum torque decrease dlnmax is greater than the judgement value dlnlvlmx, the ECU 30 proceeds to step S604 and determines that there is a misfire. The difference in the velocity of the crankshaft becomes great when there is a misfire in the cylinders in comparison to when combustion in the cylinders is regular.

At step S605, the ECU 30 adds a predetermined value Cs to the target SCV angle scvrat of the previous cycle to renew the target SCV angle scvrat. This increases the opening angle of the SCV 17 and decreases the force of the swirl. At step S606, the ECU 30 clears and sets a count value cdlnlvl of a counter, which is incorporated in the ECU 30, to zero. The ECU 30 then temporarily terminates subsequent processing.

In step S603, if the maximum torque decrease dlnmax is equal to or smaller than the misfire judgement value dlnlvlmx, the ECU 30 proceeds to step S607. At step S607, the ECU 30 adds one in an incremental manner to the count value cdlnlvl of the counter.

At step S608, the ECU 30 judges whether or not the count value cdlnlvl has reached a predetermined reference count value C1. This is to determine whether or not a certain time period corresponding to the reference count value C1 has elapsed. If it is determined that the count value cdlnlvl has not yet reached the reference count value C1, the ECU 30 terminates subsequent processing.

If it is determined that the count value cdlnlvl has reached the reference count value C1, the ECU 30 proceeds to step S609 and determines that combustion in the cylinders has been stable for the certain period of time.

At step S610, the ECU 30 judges whether or not the average torque decrease dlnmean of the torque decrease dln is greater than a torque fluctuation target value dlnlvl0. If the average torque decrease dlnmean is equal to or smaller than the target value dlnlvl0, the ECU 30 determines that the angle of the SCV 17 is within a control range shown in FIG. 4(*a*). In this case, the ECU 30 temporarily terminates subsequent processing.

If the average torque decrease dlnmean is greater than the target value dlnlvl0, the ECU 30 determines that the torque fluctuation must be decreased to obtain smooth operation of the engine 1. In this case, the ECU 30 proceeds to step S611 and subtracts the predetermined value Cs from the target SCV angle scvrat of the previous cycle to renew the target SCV angle scvrat. This decreases the opening angle of the SCV 17 and increases the force of the swirl.

At step S612, the ECU 30 clears and sets the count value cdlnlvl of the counter to zero. The ECU 30 then temporarily terminates subsequent processing.

Figure 4:
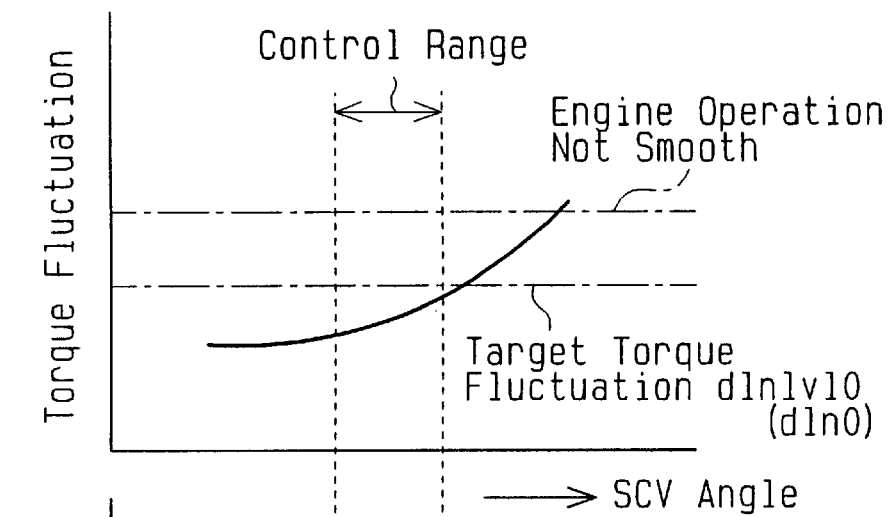
FIG. 4($a$) is a graph showing the relationship between the SCV opening angle and torque fluctuation.
Figure 4:
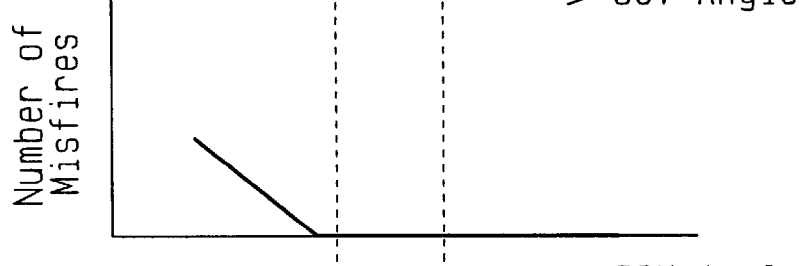
Figure 4:
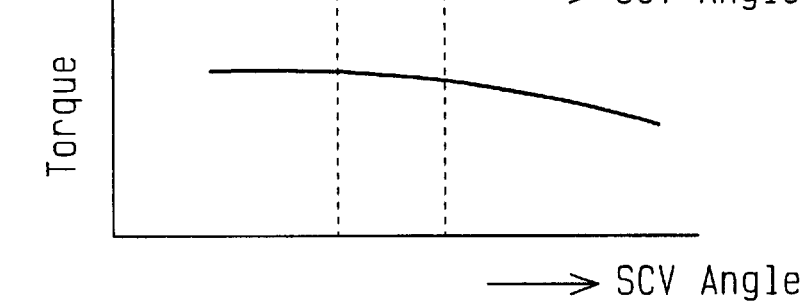

The operation and advantageous effects of this embodiment will now be described with reference to FIGS. 4(*a*), 4(*b*), and 4(*c*).

(1) As described in the background of the invention, the actual opening angle of the SCV 17 and the force of the swirl differ between engines 1. The clearance between the intake passage and the SCV 17, the fuel spray, and the required swirl force also differ between engines. This results in engine output differing between engines 1.

To solve this problem, in this embodiment, the ECU 30 determines the occurrence of a misfire when the maximum torque decrease dlnmax is greater than the misfire judgement value dlnlvlmx. In this case, the ECU 30 increases the target SCV angle scvrat to increase the opening angle of the SCV 17. This decreases the force of the swirl and reduces the number of misfires, as shown in FIG. 4(*b*).

(2) In this embodiment, if the average torque decrease dlnmean is greater than the torque fluctuation target value dlnlvl0, the ECU 30 decreases the target SCV angle scvrat. As the target SCV angle scvrat decreases, the opening angle of the SCV 17 decreases. This increases the force of the swirl and decreases torque fluctuation, as shown in FIG.

4(a), thus causing smooth operation of the engine 1. Furthermore, by controlling the SCV angle, torque decrease caused by an excessive increase in the opening angle of the SCV 17 is minimal, as shown in FIG. 4(c).

A second embodiment according to the present invention will now be described. To avoid a redundant description, like or same reference numerals are given to those components that are the same as the corresponding components of the first embodiment. Parts that differ from the first embodiment will now be described.

Figure 5:
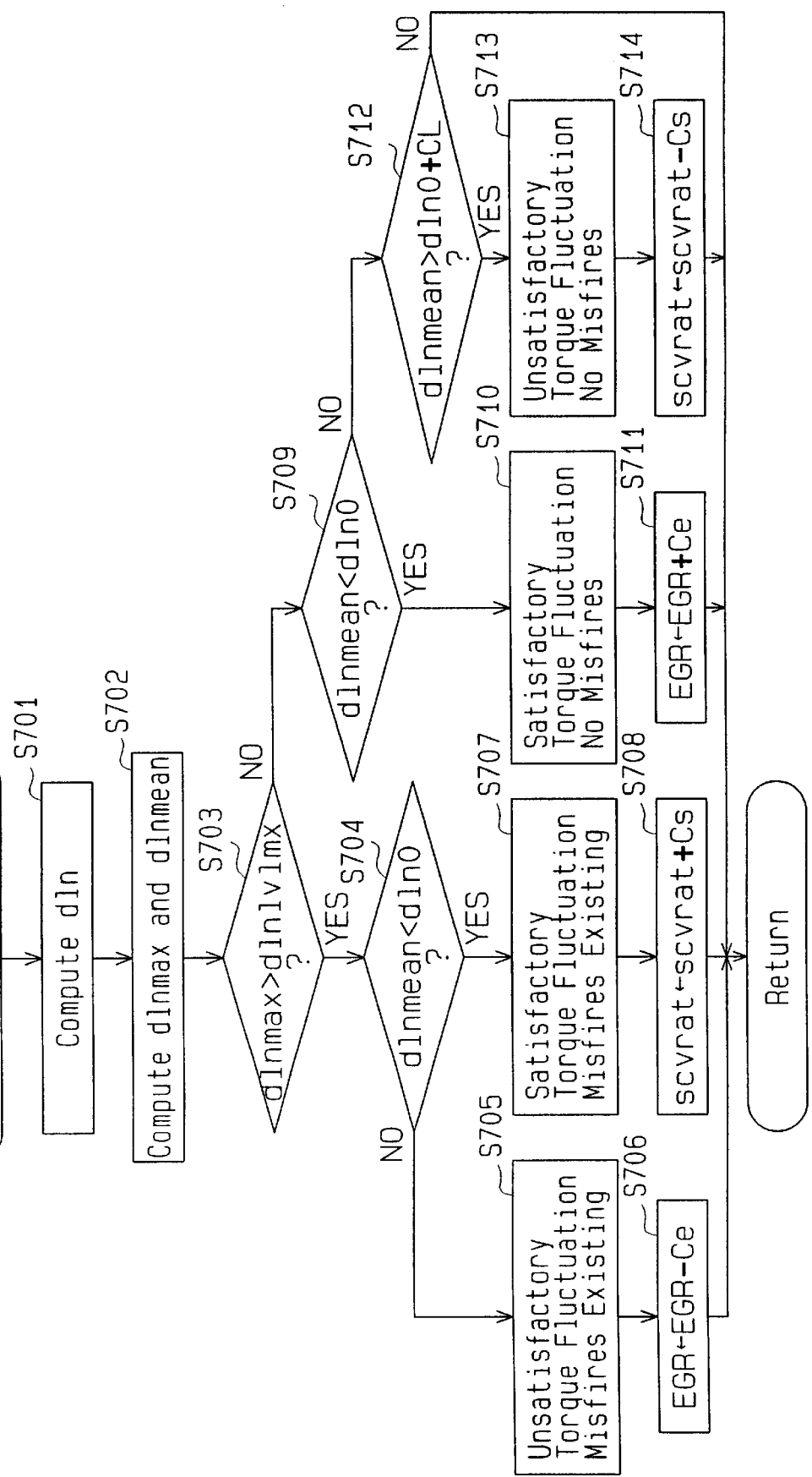
FIG. 5 is a flowchart illustrating a swirl control valve and exhaust gas recirculation control routine executed by the ECU in a second embodiment according to the present invention.
Figure 6:
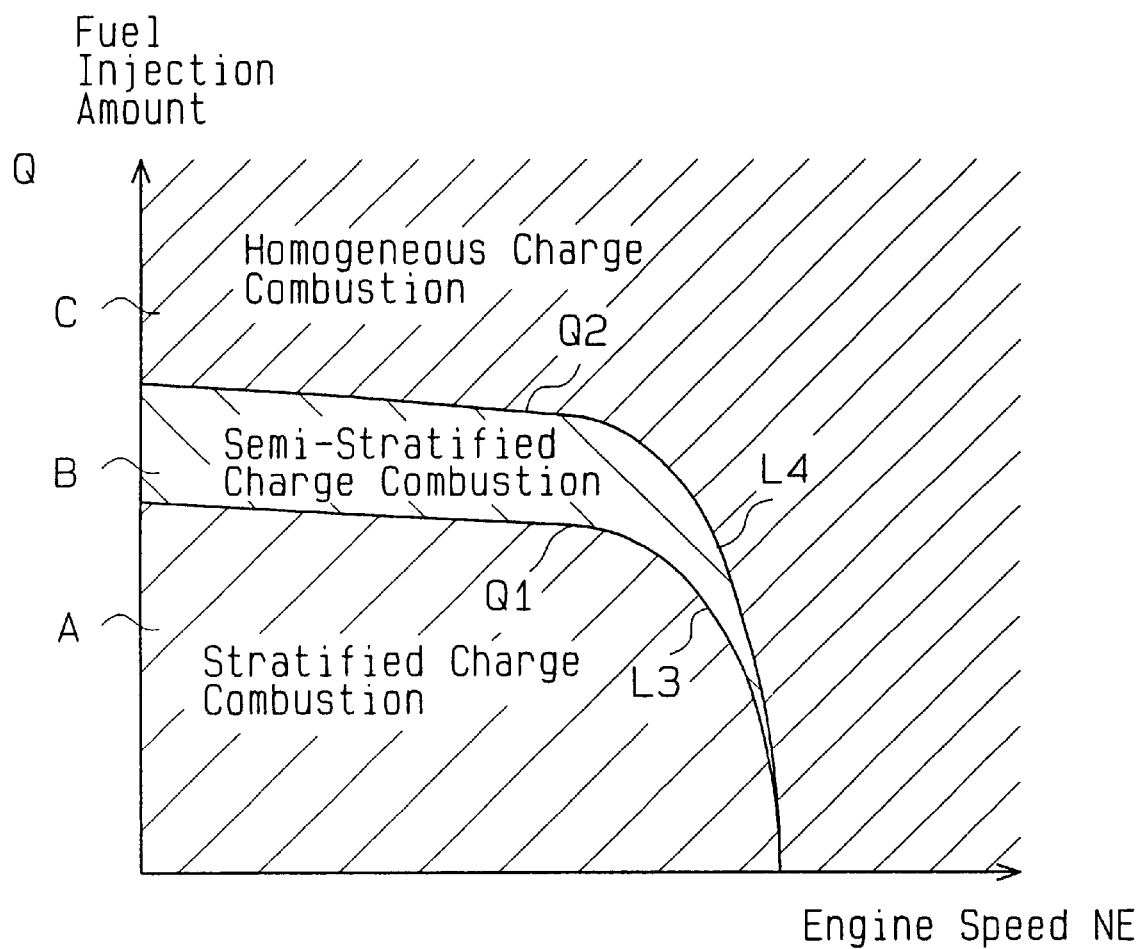

This embodiment differs from the first embodiment in that the ECU 30 controls the EGR valve 53 in addition to the SCV 17. FIG. 5 shows a flowchart illustrating a routine for controlling the air intake, or the swirl control valve and exhaust gas circulation control routine, executed during stratified charge combustion to control each swirl control valve (SCV) 17 and to control the exhaust gas recirculation. This control routine is executed once for every predetermined angle (e.g., 720 degrees CA).

When entering this routine, the ECU 30 first carries out step S701 and computes the torque decrease dln in the same manner as in the first embodiment.

At step S702, the ECU 30 refers to the value of the torque decrease dln in the previous cycle and the torque decrease obtained in the prior step (step S701) to select the maximum torque decrease dlnmax and compute the average torque decrease dlnmean.

At step S703, the ECU 30 determines whether or not the present maximum torque decrease dlnmax is less than a predetermined misfire judgement value dlnlvlmx. If the maximum torque decrease dlnmax is greater than the judgement value dlnlvlmx, the ECU 30 proceeds to step S704.

At step S704, the ECU 30 judges whether or not the average torque decrease dlnmean is greater than a torque fluctuation target value dln0 (which may be different from or the same as the torque fluctuation target value dlnlv0 of the first embodiment). If the average torque decrease dlnmean is equal to or greater than the target value dln0, the ECU 30 proceeds to step S705 and determines that the torque fluctuation is unsatisfactory and that there is a misfire. The ECU 30 then proceeds to step S706.

At step S706, the ECU 30 puts priority on the reduction of the EGR amount instead of the swirl force and subtracts a predetermined value Ce from a target EGR opening degree EGR of the previous cycle to renew the target EGR opening degree. The ECU 30 then temporarily terminates subsequent processing.

In step S704, if the average torque decrease dlnmean is smaller than the target value dln0, the ECU 30 proceeds to step S707 and determines that, although the torque fluctuation is satisfactory, there is a misfire. The ECU 30 then proceeds to step S708 and adds a predetermined value Cs to the target SCV angle scvrat of the previous cycle to renew the target SCV angle scvrat. This increases the opening angle of the SCV 17 and decreases the force of the swirl.

In step S703, if the maximum torque decrease dlnmax is less than or equal to the misfire judgement value dlnlvlmx, the ECU 30 proceeds to step S709. At step S709, the ECU 30 judges whether or not the average torque decrease dlnmean is smaller than the torque fluctuation target value dln0. If the average torque decrease dlnmean is smaller than the target value dln0, the ECU 30 proceeds to step S710 and determines that the torque fluctuation is satisfactory and that there are no misfires. The ECU 30 then proceeds to step S711.

At step S711, the ECU 30 adds the predetermined value Ce to the target EGR opening degree EGR of the previous cycle to renew the target EGR opening degree. This increases the amount of EGR to reduce exhaust gas emissions and improve fuel efficiency. The ECU 30 then temporarily terminates subsequent processing.

In step S709, if the average torque decrease dlnmean of the torque decrease dln is equal to or greater than the torque fluctuation target value dln0, the ECU 30 proceeds to step S712. At step S712, the ECU 30 judges whether or not the average torque decrease dlnmean is greater than the sum of the torque fluctuation target value dln0 and a predetermined value CL. If the average torque decrease dlnmean is greater than the sum of the target value dln0 and the predetermined value CL, the ECU 30 proceeds to step S713 and determines that, although the torque fluctuation is unsatisfactory, there are no misfires. The ECU 30 then proceeds to step S714.

At step S714, the ECU 30 subtracts the predetermined value Cs from the target SCV angle scvrat of the previous cycle to renew the target SCV angle scvrat. This decreases the opening angle of the SCV 17 and increases the force of the swirl.

In step S712, if the average torque decrease dlnmean of the torque decrease dln is equal to or smaller than the sum of the torque fluctuation target value dln0 and the predetermined value CL, the ECU 30 temporarily terminates subsequent processing.

(1) The operation and advantageous effects of this embodiment are basically the same as the first embodiment. Additionally, in this embodiment, if the average torque decrease dlnmean of the torque fluctuation is equal to or greater than the torque fluctuation target value dln0 (when the maximum torque decrease dlnmax is greater than the misfire judgement value dlnlvlmx), the ECU 30 determines that the torque fluctuation is unsatisfactory and that there is a misfire. In this case, the ECU 30 puts priority on the reduction of the EGR amount instead of the swirl force and subtracts the predetermined value Ce from the target EGR opening degree EGR of the previous cycle to renew the target EGR opening degree. This improves combustion conditions and decreases torque fluctuations.

(2) Furthermore, if the average torque decrease dlnmean is smaller than the target value dln0 (when the maximum torque decrease dlnmax is equal to or smaller than the misfire judgement value dlnlvlmx), the ECU 30 determines that the torque fluctuation is satisfactory and that there are no misfires. In this case, the ECU 30 adds the predetermined value Ce to the target EGR opening degree EGR of the previous cycle to renew the target EGR opening degree. This increases the amount of EGR to reduce exhaust gas emissions and improve fuel efficiency without causing an increase in torque fluctuation.

In the second embodiment, the SCV 17 and the EGR valve 53 are controlled together. However, the amount of fuel injection may also be controlled together with the SCV 17 and the EGR valve 53. For example, in the second embodiment, if the average torque decrease dlnmean is smaller than the target value dln0, the amount of EGR is increased (step S711). However, instead of increasing the EGR amount, the amount of fuel injection may be decreased. This further improves fuel efficiency. Furthermore, in the second embodiment, if the average torque decrease dlnmean is equal to or greater than the target value dln0, the amount of EGR is decreased (S706). However, instead of decreasing the EGR amount, the amount of fuel injection may be increased. This positively suppresses torque fluctuation.

The EGR control may be eliminated. In this case, the SCV 17 may be controlled in combination with the fuel injection amount.

The first two embodiments are applied to an engine that injects fuel directly into its cylinders. However, the present invention may be applied to an engine that performs stratified charge combustion or semi-stratified charge combustion by injecting fuel into the cylinders through the intake ports. For example, the present invention may be applied to an engine that injects fuel toward the stems of the valve heads of the intake valves 6a, 6b.

The first two embodiments are applied to gasoline engines. However, the present invention may also be applied to diesel engines.

A third embodiment according to the present invention will now be described with reference to FIGS. 6–18.

Figure 7:
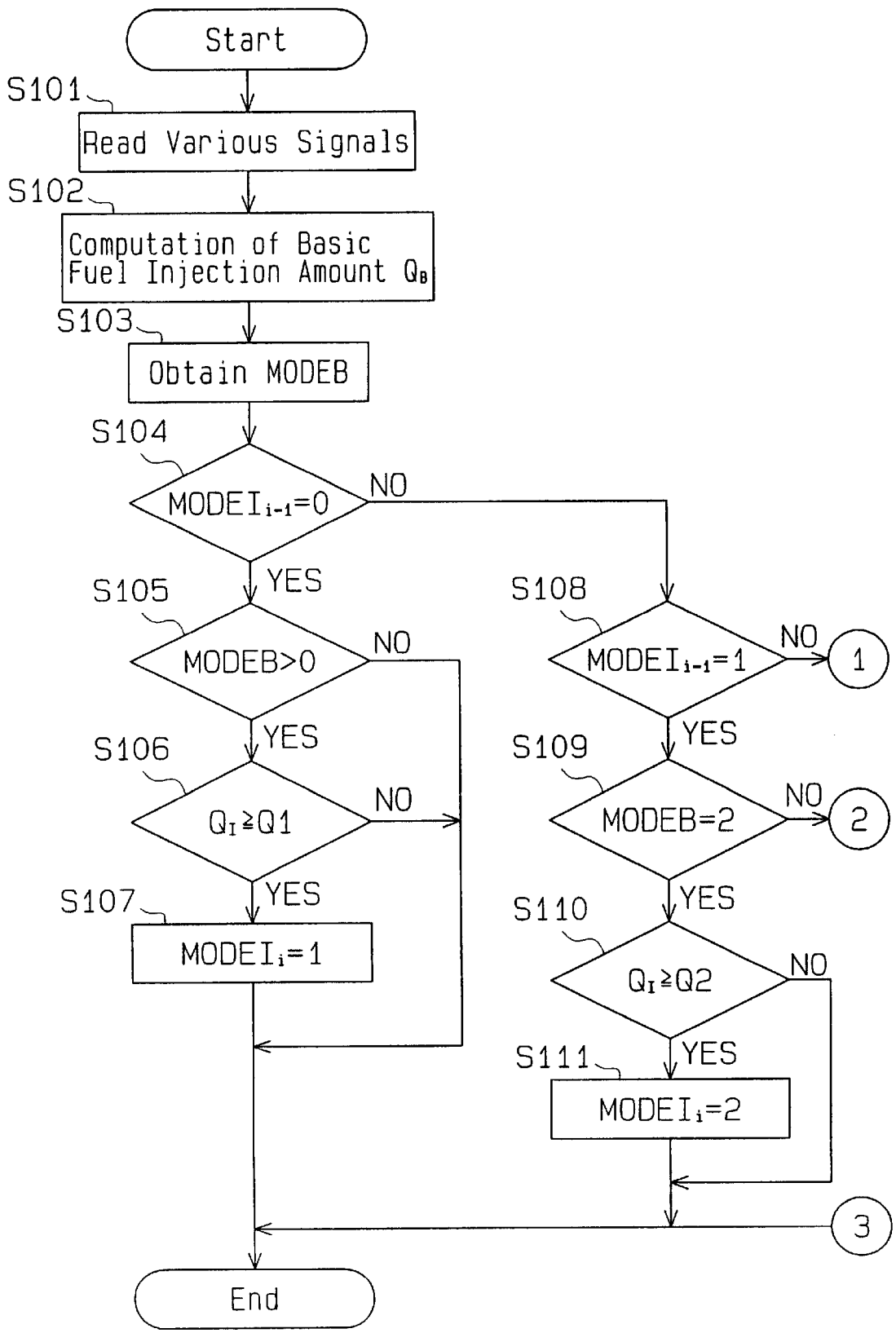
Figure 8:
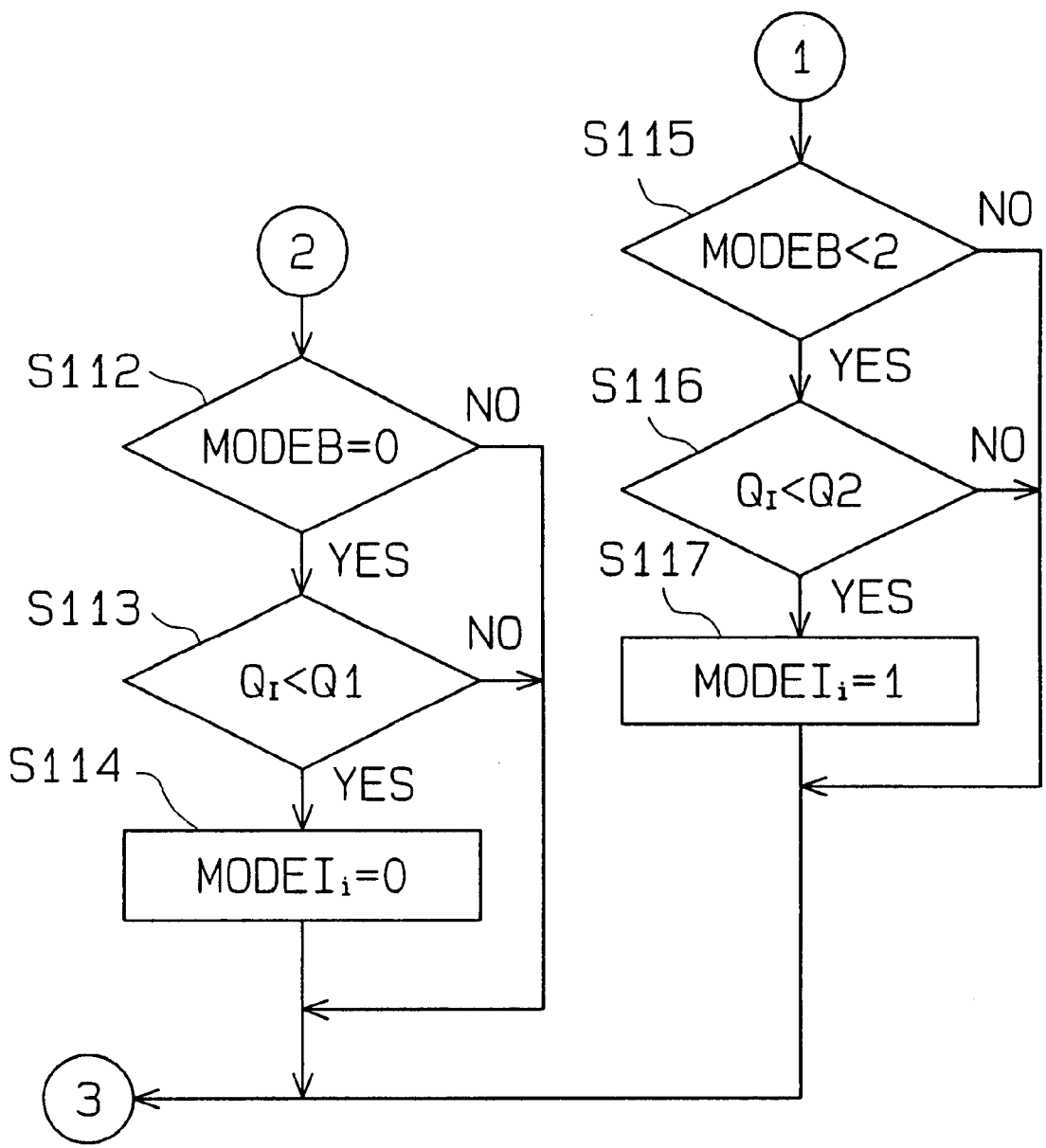

FIGS. 7 and 8 show a flowchart of a main routine executed by the ECU 30 and used to determine the actual combustion mode, or first mode MODEI. The first mode MODEI is selected from three lean combustion modes, which are stratified charge combustion, semi-stratified charge combustion, and homogeneous charge combustion. For example, when MODEI is zero, stratified charge combustion is indicated. When MODEI is one, semi-stratified charge combustion is indicated. When MODEI is two, homogeneous charge combustion is indicated. The fuel injection valve 11 and the swirl control valve 17 are controlled in accordance with the first mode MODEI.

Stratified charge combustion and semi-stratified charge combustion are described in the Background of the Invention. In the third embodiment, homogeneous charge combustion is realized by injecting fuel into the compression chamber during the intake stroke.

When entering the routine of FIG. 7, at step S101, the ECU 30 reads the signals from the sensors 25–29 that indicate the engine speed NE, the acceleration pedal depression degree ACCP, and other information. The ECU 30 then proceeds to step S102 and obtains the basic fuel injection amount $Q_B$ from a basic fuel injection map (not shown) in accordance with the engine speed NE, the acceleration pedal depression degree ACCP, and other information that has been read. The basic fuel injection amount $Q_B$ represents the theoretical load of the engine 1.

Figure 9:
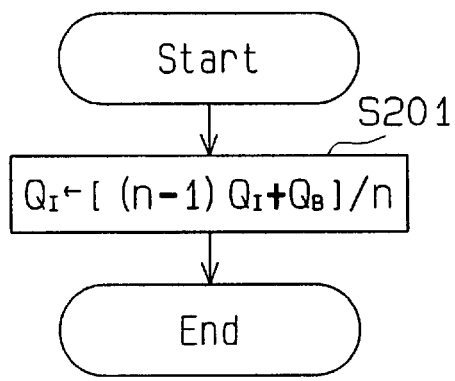
Figure 10:
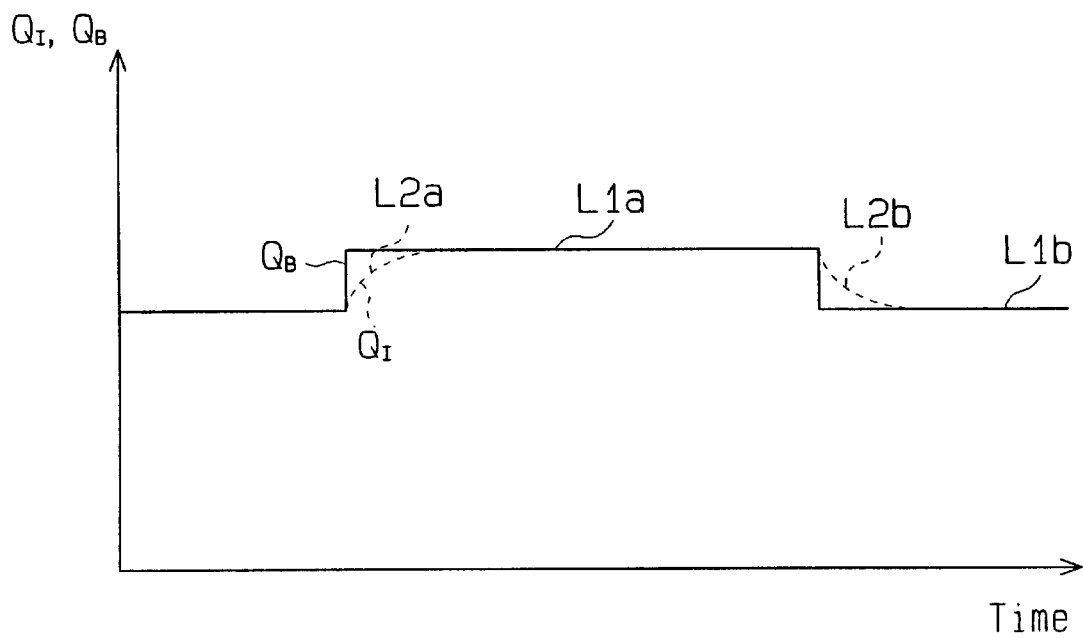

A routine for computing a graded fuel injection amount $Q_f$ corresponding to the basic fuel injection amount $Q_B$ will now be described with reference to the flowchart of FIG. 9. The ECU 30 executes this routine cyclically in an interrupting manner once for every predetermined crank angle or once every predetermined time interval.

When entering this routine, at step S201, the ECU 30 corrects the basic fuel injection amount $Q_B$ to renew the graded fuel injection amount $Q_f$. More specifically, the ECU 30 multiplies the graded fuel injection amount $Q_f$ of the previous cycle by (n–1) (n is a constant). The obtained value is added to the basic fuel injection amount $Q_B$. The sum is then divided by n to obtain the graded fuel injection amount $Q_f$. The ECU 30 then temporarily terminates subsequent processing. The actual load of the engine 1 is represented by the graded fuel injection amount $Q_f$.

If the acceleration pedal depression degree ACCP is constant, the graded fuel injection amount $Q_f$, which is computed by correcting the basic fuel injection amount $Q_B$, is equal to the basic fuel injection amount $Q_B$. If the acceleration pedal depression degree ACCP increases suddenly during acceleration causing the basic fuel injection amount $Q_B$ to change drastically, as shown by the solid line L1a, L1b in FIG. 10, the graded fuel injection amount $Q_f$ shifts as shown by dotted line L2a, L2b. That is, the graded fuel injection amount $Q_f$ changes more gradually than the basic fuel injection amount $Q_B$.

Therefore, if the acceleration pedal depression degree ACCP increases and decreases suddenly, fuel corresponding to the graded fuel injection amount $Q_f$ is injected from the fuel injection valve 11. The injection amount corresponds to the available amount of air intake and exhaust gas recirculation, which are delayed in response to a sudden change of the acceleration pedal depression degree ACCP. Accordingly, the amount of fuel injected from the fuel injection valve 11 corresponds to the intake air. This enables the air-fuel mixture to be maintained at an optimum air-fuel ratio during acceleration.

Returning to the routine for determining the first mode MODEI, after computing the basic fuel injection amount $Q_B$ in step S102, the ECU 30 proceeds to step S103. At step S103, the ECU 30 determines the basic combustion mode, or second mode MODEB, in accordance with the engine speed NE and the basic fuel injection amount Q1 by referring to the mode map shown in FIG. 6. The mode map includes ranges A, B, and C. The fuel injection amount Q1 between range A and range B (shift value) changes as shown by solid line L3. The fuel injection amount Q2 between range B and range C (shift value) changes as shown by solid line L4.

If the engine speed NE and the basic fuel injection amount $Q_B$ are in range A, stratified charge combustion is preferred. In this case, the ECU 30 sets the second mode MODEB or the first mode MODEI at zero (stratified charge combustion). In the same manner, if the engine speed NE and the basic fuel injection amount $Q_B$ are in range B, semi-stratified charge combustion is preferred. Hence, the ECU 30 sets either the second mode MODEB or the first mode MODEI at one (semi-stratified charge combustion). If the engine speed NE and the basic fuel injection amount $Q_B$ are in range C, homogeneous charge combustion is required. In this case, is the ECU 30 sets the second mode MODEB or the first mode MODEI at two (homogeneous charge combustion).

At step S104, the ECU 30 judges whether or not the first mode $MODEI_{i-1}$ of the previous cycle is set at zero. If the first mode $MODEI_{i-1}$ is set at zero, the ECU 30 proceeds to step S105 and judges whether or not the second mode MODEB is greater than zero. If the second mode MODEB is equal to zero, the ECU 30 temporarily terminates this routine. If the second mode MODEB is greater than zero, the ECU 30 proceeds to step S106.

At step S106, the ECU 30 determines whether or not the graded fuel injection amount $Q_f$ is equal to or greater than the fuel injection amount Q1. If the graded fuel injection amount $Q_f$ is smaller than the fuel injection amount Q1, the ECU 30 temporarily terminates subsequent processing. If the graded fuel injection amount $Q_f$ is equal to or greater than the fuel injection amount Q1, the ECU 30 proceeds to step S107. At step S107, the ECU 30 sets the present first mode $MODEI_i$ to one (semi-stratified charge combustion). This shifts the combustion mode of the engine 1 to semi-stratified charge combustion from stratified charge combustion.

In step S104, if the first mode $MODEI_{i-1}$ of the previous cycle is not set at zero, the ECU 30 proceeds to step S108 and judges whether or not the first mode $MODEI_{1-i}$ of the previous mode is set at one (semi-stratified charge combustion). If the first mode $MODEI_{1-}$ is set at one, the ECU 30 proceeds to step S109. At step S109, the ECU 30 judges whether the second mode MODEB is set at two. If the second mode MODEB is set at two in step S109, the ECU 30 proceeds to step S110 and judges whether or not the graded fuel injection amount $Q_f$ is equal to or greater than the fuel injection amount Q2. If the graded fuel injection amount $Q_I$ is smaller than the fuel injection amount Q2, the ECU 30 temporarily terminates subsequent processing. If the graded fuel injection amount $Q_I$ is equal to or greater than the fuel injection amount Q2, the ECU 30 proceeds to step S111 and sets the present first mode $MODEI_i$ to two (homogeneous charge combustion). This shifts the combustion mode of the engine 1 to homogeneous charge combustion from semi-stratified charge combustion.

In step S109, if the second mode MODEB is not set at two, the ECU 30 proceeds to step S112 and judges whether or not the second mode MODEB is set at zero. If the second mode MODEB is not set at zero, the ECU 30 temporarily terminates subsequent processing. If the second mode MODEB is set at zero, the ECU 30 proceeds to step S113. At step S113, the ECU 30 judges whether or not the graded fuel injection amount $Q_I$ is smaller than the fuel injection amount Q1. If the graded fuel injection amount $Q_I$ is equal to or greater than the fuel injection amount Q1, the ECU 30 temporarily terminates subsequent processing. In step S113, if it is determined that the graded fuel injection amount $Q_I$ is smaller than the fuel injection amount Q1 in step S113, the ECU 30 proceeds to step S114 and sets the present first mode $MODEI_i$ to zero (stratified charge combustion). This shifts the combustion mode of the engine 1 to stratified charge combustion from semi-stratified charge combustion.

In step S108, if it is determined that the first mode $MODEI_{1-i}$ is not set at one, the ECU 30 proceeds to step S115 (FIG. 8) and judges whether or not the second mode MODEB is smaller than two. If the second mode MODEB is equal to two, the ECU 30 temporarily terminates subsequent processing. If the second mode MODEB is smaller than two, the ECU 30 proceeds to step S116. At step S116, the ECU 30 judges whether or not the graded fuel injection amount $Q_I$ is smaller than the fuel injection amount Q2. If the graded fuel injection amount $Q_I$ is equal to or greater than the fuel injection amount Q2, the ECU 30 temporarily terminates subsequent processing. If it is determined that the graded fuel injection amount $Q_I$ is smaller than the fuel injection amount Q2, the ECU 30 proceeds to step S117 and sets the present first mode $MODEI_i$ to one (semi-stratified charge combustion). This shifts the combustion mode of the engine 1 to semi-stratified charge combustion from homogeneous charge combustion.

If the acceleration pedal is depressed during acceleration and the acceleration pedal depression degree ACCP is shifted from a value corresponding to a completely closed state to a value corresponding to a completely opened state, the basic fuel injection amount $Q_B$ obtained from the basic fuel injection amount map increases suddenly. Thus, the second mode MODEB shifts from zero to two, as illustrated in FIG. 11(a). However, the suddenly increased fuel injection amount $Q_B$ is graded, or corrected. Thus, the resulting graded fuel injection amount $Q_I$ is increased gradually. This sequentially shifts the first mode MODEI from zero to one and then from one to two, as shown in FIG. 11(b). As a result, this produces a state in which the first mode MODEI is set at one even if the second mode MODEB is set at two.

If the acceleration pedal is raised during deceleration and the acceleration pedal depression degree ACCP is shifted from a value corresponding to a completely opened state to a value corresponding to a completely closed state, the basic fuel injection amount $Q_B$ obtained from the basic fuel injection amount map decreases suddenly. Thus, the second mode MODEB shifts from two to zero, as illustrated in FIG. 12(a). However, the suddenly decreased fuel injection amount $Q_B$ is graded, or corrected. Thus, the resulting graded fuel injection amount $Q_I$ is decreased gradually. This sequentially shifts the first mode MODEI from two to one and then to zero, as shown in FIG. 12(b). As a result, this produces a state in which the first mode MODEI is set at one, even if the second mode MODEB is set at zero.

Figure 13:
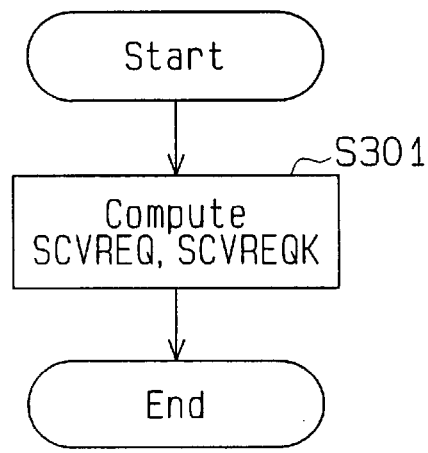
Figure 14:
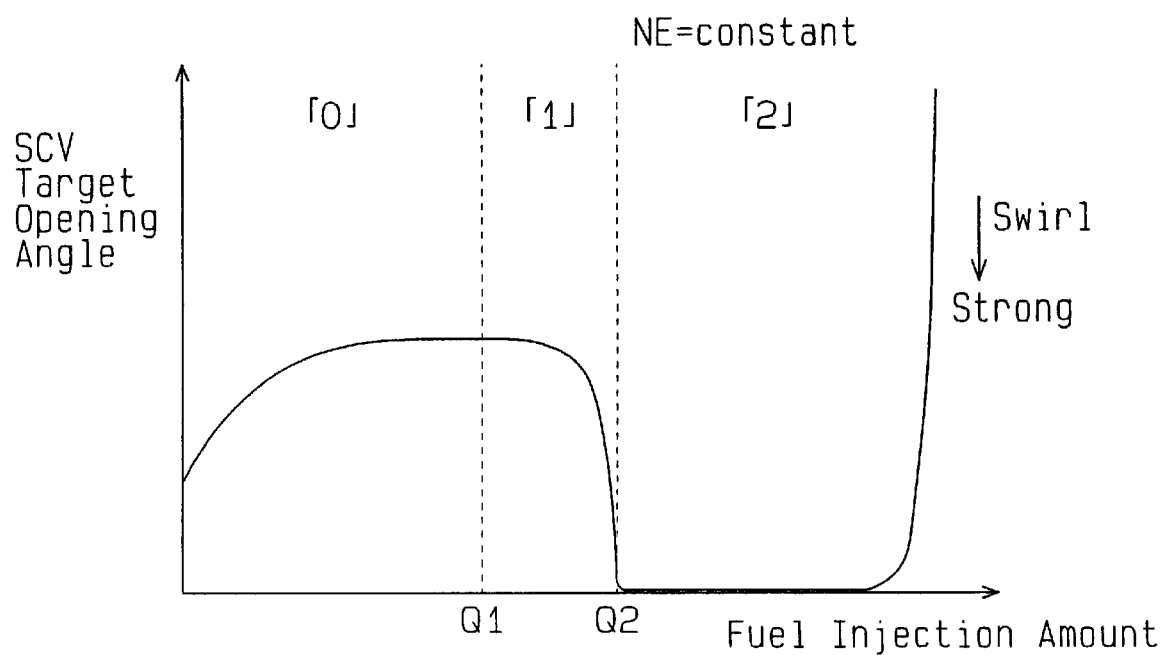

FIG. 13 shows a flowchart of a routine for computing a target opening angle SCVREQ and tentative target opening angle SCVREQK of the swirl control valve 17. When entering the routine, at step S301, the ECU 30 obtains the target opening angle SCVREQ based on the basic fuel injection amount $Q_B$ and the engine speed NE by referring to a valve opening angle map (such as that shown in FIG. 14) in correspondence with the second mode MODEB. Furthermore, the ECU 30 obtains the tentative target opening angle SCVREQK based on the graded fuel injection amount $Q_I$ and the engine speed NE by referring to the valve opening angle map in correspondence with the first mode MODEI.

When the engine 1 is operating in a constant state, the values of the basic fuel injection amount $Q_B$ and the graded fuel injection amount $Q_I$ are equal to each other. Furthermore, the values of the second mode MODEB and the first mode MODEI are equal to each other. Accordingly, the value of the target opening angle SCVREQ is equal to the value of the tentative target opening angle SCVREQK. During acceleration or deceleration of the engine 1, the value of the basic fuel injection amount $Q_B$ differs from the value of the graded fuel injection amount $Q_I$. Thus, the value of the second mode MODEB may differ from the value of the first mode MODEI. In this case, the value of the target opening angle SCVREQ differs from the value of the tentative target opening angle SCVREQK.

During acceleration, if the second mode MODEB is set at two while the first mode MODEI is set at one, the target opening angle SCVREQ and the tentative target opening angle SCVREQK take different values as shown in FIGS. 11(a), 11(b), and 11(c). During deceleration, if the second mode MODEB is set at zero while the first mode MODEI is set at one, the target opening angle SCVREQ and the tentative target opening angle SCVREQK take different values as shown in FIGS. 12(a), 12(b), and 12(c).

Figure 15:
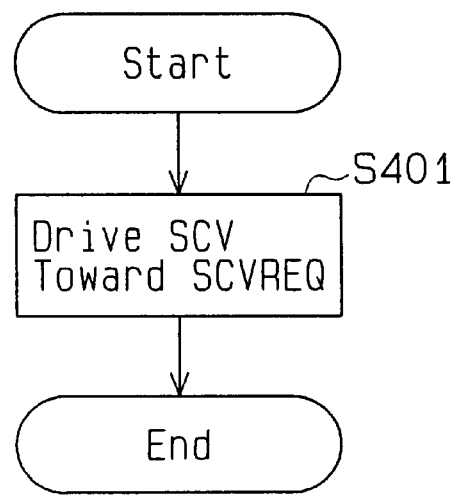

FIG. 15 shows a flowchart illustrating a routine executed by ECU 30 for driving the swirl control valve 17. When entering the routine, at step S401, the ECU 30 drives the swirl control valve 17 so that the actual opening angle SCVP of the swirl control valve 17 detected by the swirl control valve sensor 29 is shifted to the target opening angle SCVREQ.

Figure 16:
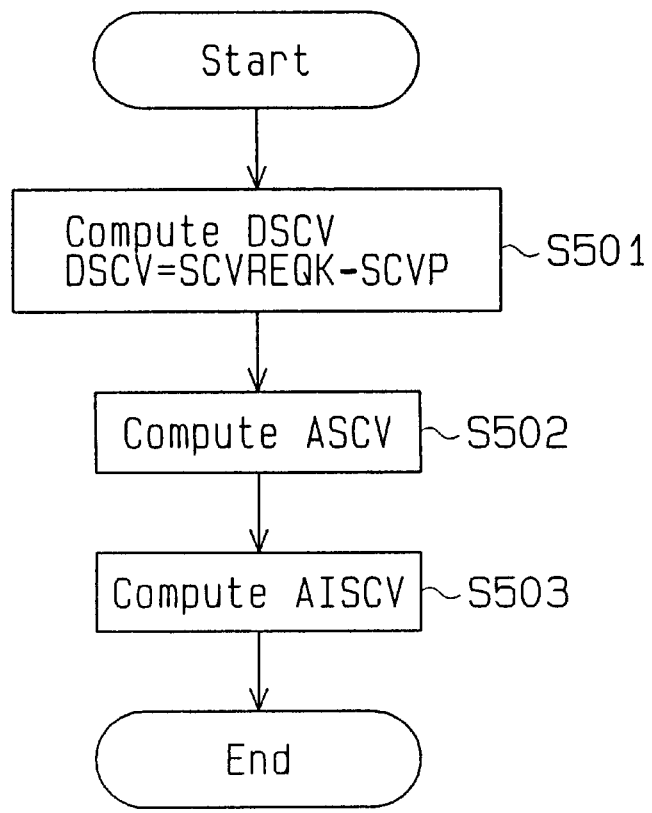

A routine for computing the correction value of the basic injection timing relative to the crank angle corresponding to the ignition timing and the fuel injection timing will now be described with reference to the flowchart of FIG. 16. This routine is executed by the ECU 30 once for every predetermined crank angle.

When entering the routine, at step S501, the ECU 30 computes the opening angle deviation DSCV by subtracting the actual opening angle SCVP from the tentative target opening angle SCVREQK of the swirl control valve 17. At step S502, the ECU 30 obtains the ignition timing correction value ASCV corresponding to the opening angle deviation DSCV from an ignition timing correction value map shown in FIG. 17(a). When the value of the opening angle deviation DSCV is positive, that is, when the tentative target opening angle SCVREQK is greater than the actual opening angle SCVP, the actual opening angle SCVP is small and the force of the swirl is stronger than required. Thus, the ignition timing correction value ASCV advances the ignition timing.

If the value of the opening angle deviation DSCV is negative, that is, if the tentative target opening angle SCVREQK is smaller than the actual opening angle SCVP, the actual opening angle SCVP is large and the force of the swirl is weaker than required. Thus, the ignition timing correction value ASCV retards the ignition timing.

The ECU 30 sets the final ignition timing by adding the ignition timing correction value ASCV to the basic ignition timing, which is obtained in accordance with the operating conditions of the engine 1. If the ignition timing correction value ASCV is positive, the final ignition timing is advanced with respect to the crankshaft. If the ignition timing correction value ASCV is negative, the final ignition timing is retarded with respect to the crankshaft.

Figure 17A:
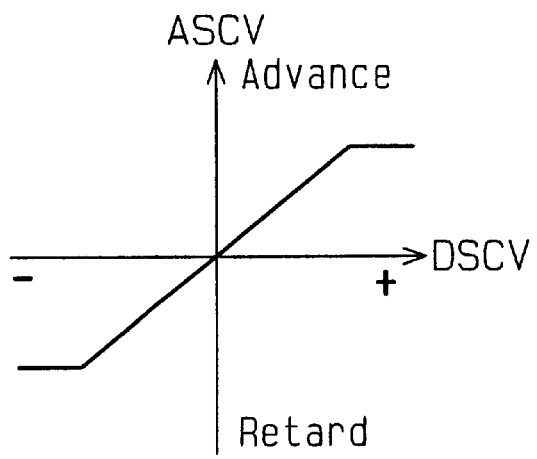
FIG. 17(a) is a map illustrating the relationship between the ignition timing correction value and the angle deviation.
Figure 17B:
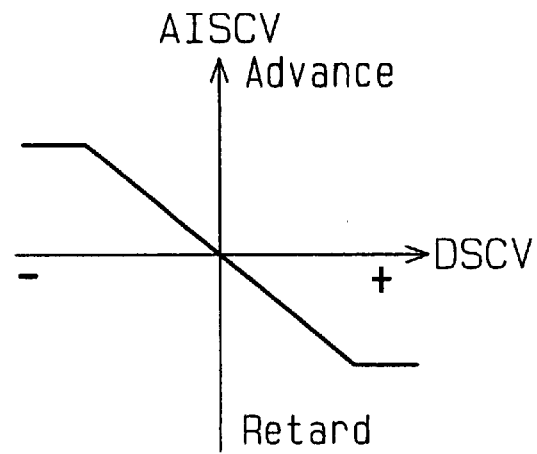
FIG. 17(b) is a map illustrating the relationship between the fuel injection timing correction value and the angle deviation.

At step S503, the ECU 30 obtains the fuel injection timing correction value AISCV corresponding to the opening angle deviation DSCV from a fuel injection timing correction value map shown in FIG. 17(b). When the value of the opening angle deviation DSCV is positive, that is, when the tentative target opening angle SCVREQK is greater than the actual opening angle SCVP, the actual opening angle SCVP is small and the force of the swirl is stronger than required. Thus, the fuel injection timing correction value AISCV retards the fuel injection timing. If the value of the opening angle deviation DSCV is negative, that is, if the tentative target opening angle SCVREQK is smaller than the actual opening angle SCVP, the actual opening angle SCVP is large and the force of the swirl is weaker than required. Thus, the fuel injection timing correction value AISCV advances the fuel injection timing.

The ECU 30 sets the final fuel injection timing by adding the fuel injection correction value AISCV to the basic fuel injection timing, which is obtained in accordance with the operating conditions of the engine 1. If the fuel injection timing correction value AISCV is negative, the final fuel injection timing is retarded with respect to the crankshaft. If the fuel injection timing correction value AISCV is positive, the final ignition timing is advanced with respect to the crankshaft.

When the tentative target opening angle SCVREQK is greater than the actual opening angle SCVP causing the force of the swirl to become stronger than required, the ignition timing and the fuel injection timing are corrected by increasing the ignition timing correction va lue ASCV and decreasing the fuel injection timing correction value AISCV. Therefore, if there is a response delay in the opening action of the swirl control valve 17, the final ignition timing is advanced and the final fuel injection timing is retarded. This correction causes air-fuel mixture to be delivered to an optimum position in the vicinity of the spark plug 10 in correspondence with the ignition timing. Thus, the correction of the ignition timing and the fuel injection timing causes satisfactory combustion.

Figure 18:
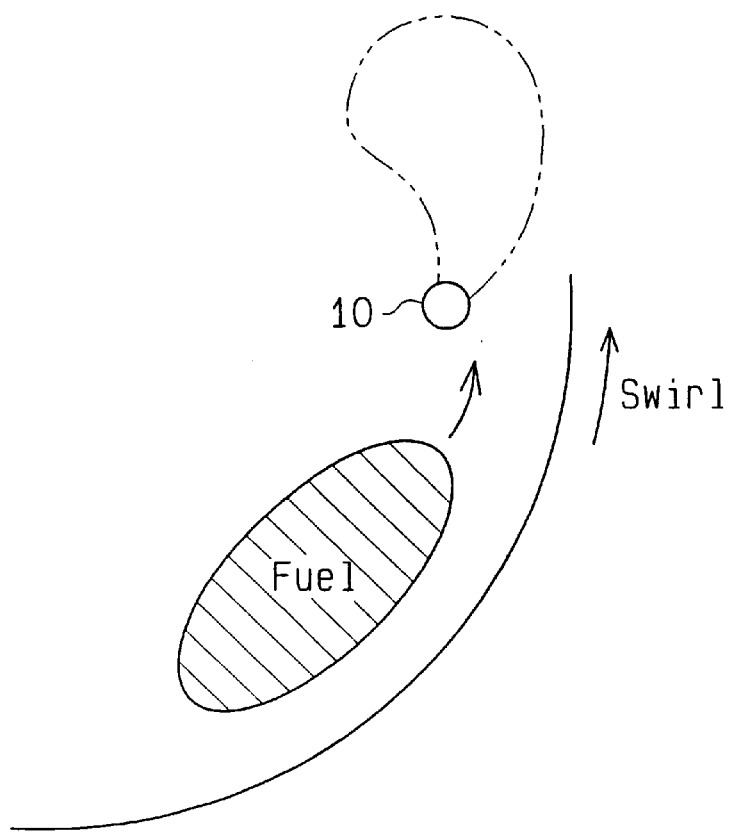

If the tentative target opening angle SCVREQK is smaller than the actual opening angle SCVP causing the force of the swirl to become weaker than required, the ignition timing correction value ASCV is decreased while the fuel injection timing correction value AISCV is increased. Therefore, if there is a response delay in the closing action of the swirl control valve 17, the final ignition timing is retarded and the final fuel injection timing is advanced. This correction causes air-fuel mixture to be delivered to an optimum position (as indicated by the dotted line in FIG. 18) in the vicinity of the spark plug 10 in correspondence with the ignition timing, as shown in FIG. 18. Thus, the correction of the ignition timing and the fuel injection timing causes improved satisfactory combustion.

The advantageous effects described below result from the structure of this embodiment.

(a) To obtain the ignition timing correction value ASCV and the fuel injection timing correction value AISCV, the tentative target opening angle SCVREQK is obtained based on the graded fuel injection amount $Q_I$ that corresponds to the actual engine load. The actual opening angle SCVP of the swirl control valve 17 is then subtracted from the tentative target opening angle SCVREQK to compute the opening angle deviation DSCV. The ignition timing correction value ASCV and the fuel injection timing correction value AISCV are obtained from the opening angle deviation DSCV. The graded fuel injection amount $Q_I$ is computed by grading the basic fuel injection amount $Q_B$. Thus, if the basic fuel injection amount $Q_B$ changes drastically during acceleration or deceleration, the graded fuel injection amount $Q_I$ changes gradually. In this case, the basic fuel injection amount $Q_B$ differs from the graded fuel injection amount $Q_I$. However, the ignition timing correction value ASCV and the fuel injection timing correction value AISCV adequately corrects the ignition timing and the fuel injection timing. Accordingly, combustion is stabilized even when the basic fuel injection amount $Q_B$ and the graded fuel injection amount $Q_I$ differ from each other due to grading correction during acceleration or deceleration. This prevents the occurrence of misfires.

(b) The absolute values of the ignition timing correction value ASCV and th e fuel injection timing correction value AISCV increase as the absolute value of the opening angle deviation DSCV increases. This enables ignition and fuel injection to be performed at timings that are optimal for ignition and combustion. Accordingly, combustion is stabilized and misfires are prevented.

(c) The ignition timing and the fuel injection timing are both adequately corrected in accordance with the opening angle deviation DSCV between the tentative target opening angle SCVREQK and the actual opening angle SCVP. Therefore, combustion is stabilized and misfires are prevented when there is a response delay in the opening and closing action of the swirl control valve 17.

The third embodiment may be modified as described below.

In the third embodiment, the ignition timing and the fuel injection timing are both corrected. However, correction of either one of the ignition timing and the fuel injection timing may be eliminated. This reduces the computing load of the ECU 30.

In the third embodiment, the swirl control valve 17 is provided in each second intake passage 15b. However, the swirl control valve 17 may instead be provided in each first intake passage 15a. In this case, the force of the swirl becomes stronger as the opening angle of the swirl control valve 17 increases. Thus, the positive values of the ignition timing correction value ASCV and the fuel injection correction value AISCV, which correspond to the opening angle deviation DSCV, become negative while the positive values of the same become negative. Accordingly, if the opening angle deviation DSCV is positive, the ignition timing is retarded while the fuel injection timing is advanced. On the other hand, if the opening angle deviation DSCV is negative, the ignition timing is advanced while the fuel injection timing is retarded.

In the third embodiment, the basic fuel injection amount $Q_B$ is corrected to obtain the graded fuel injection amount $Q_I$. An amount of fuel corresponding to the graded fuel injection amount $Q_I$ is then injected from the fuel injection valve 11. However, instead of such structure, an actual fuel injection amount may be computed based on the air intake amount. In this case, an amount of fuel corresponding to the actual fuel injection amount is injected from the fuel injection valve 11. Thus, if the acceleration pedal depression degree ACCP increases or decreases in a sudden manner during acceleration or deceleration, an amount of fuel appropriately corresponding with the air intake amount (the amount which follows the depression degree ACCP in a delayed manner) is injected. By obtaining the tentative target opening angle ACCP from the computed actual fuel injection amount, the timing of ignition and fuel injection is optimized. Like the third embodiment, this stabilizes combustion and prevents misfires.

The third embodiment is applied to an engine 1 that injects fuel directly into the cylinders and that shifts the combustion mode between the stratified charge combustion, semi-stratified charge combustion, and homogeneous charge combustion. For example, the present invention may be applied to an engine that injects fuel toward the stems of the valve heads of the intake valves 6a, 6b.

In the third embodiment, the combustion mode is shifted between the three modes of stratified charge combustion, semi-stratified charge combustion, and homogeneous charge combustion. However, the combustion mode may be shifted between two modes. For example, the combustion mode may be shifted between the two modes of stratified charge combustion and semi-stratified charge combustion, between the two modes of semi-stratified charge combustion and homogeneous charge combustion or between the two modes of stratified charge combustion and homogeneous charge combustion.

The actual opening angle SCVP is detected by the swirl control valve sensor 29. However, the actual opening angle may be obtained through computations using other parameters.

An actuator driven by negative pressure may be employed in lieu of the step motor 19.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

what is claimed is:

1. A combustion controller for an internal combustion engine having an air intake passage and an injector for injecting fuel, wherein lean charge combustion of mixture of the air and the fuel is executed within a combustion chamber, the controller comprising:

ignition means for igniting the mixture within the combustion chamber;

a swirl control valve for selectively opening and closing the air intake passage to swirl the mixture within the combustion chamber;

an actuator for driving the swirl control valve;

opening detecting means for detecting an opening angle of the swirl control valve;

condition detecting means for detecting operating conditions of the engine;

injection control means for controlling the fuel injection timing of the injector to execute the lean charge combustion in accordance with the detected operating conditions;

ignition control means for controlling the ignition timing of the ignition means in accordance with the detected operating conditions;

first computing means for computing a load value representing the engine load in response to the detected operating conditions;

second computing means for computing a target opening angle of the swirl control valve in response to the computed actual engine load value;

swirl control means for controlling the force of the swirl by controlling the opening angle of the swirl control valve through the actuator in response to the computed target opening angle; and correcting means for correcting at least one of the ignition timing and the fuel injection timing when the detected opening angle is different from the computed target opening angle.

2. The controller according to claim 1, wherein the engine has an output shaft, and wherein a derived value representing a theoretical engine load varies sharply as the rotation of the output shaft is sharply accelerated or decelerated, and wherein the first computing means computes a graded load value by grading the theoretical engine load value in a predetermined manner.

3. The controller according to claim 1, wherein an amount of correction of at least one of the ignition timing and the fuel injection timing increases as the difference between the detected opening angle and the computed opening angle of the swirl control valve increases.

4. The controller according to claim 1, wherein the lean charge combustion includes stratified charge combustion, semi-stratified charge combustion and homogeneous charge combustion, wherein the first control means selectively executes one of the stratified charge combustion, the semi-stratified charge combustion and the homogeneous charge combustion.

5. The controller according to claim 4, wherein the first control means activates the injector at a later stage of the compression stroke to execute the stratified charge combustion, activates the injector separately in the intake stroke and at an earlier stage of the compression stroke to execute the semi-stratified charge combustion, and activates the injector in the intake stroke to execute the homogeneous charge combustion.

* * * * *